No. 782,194. PATENTED FEB. 7, 1905.
W. S. GRAHAM.
PLANTER.
APPLICATION FILED MAY 11, 1904.
2 SHEETS—SHEET 1.
Fig. 1.
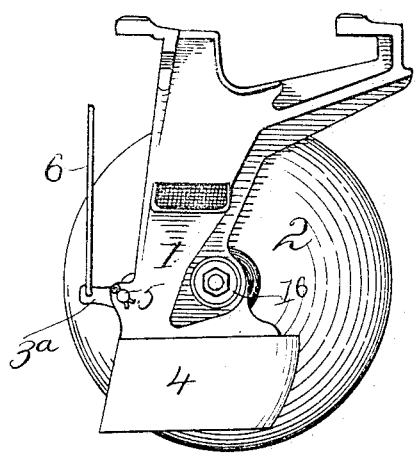
Fig. 2.
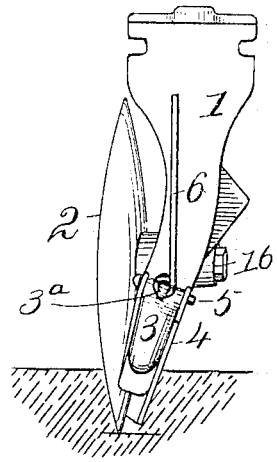
Fig. 3.
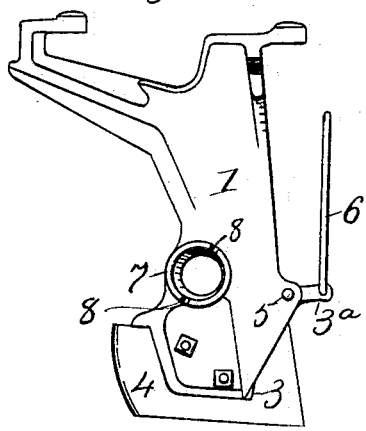
Fig. 4.
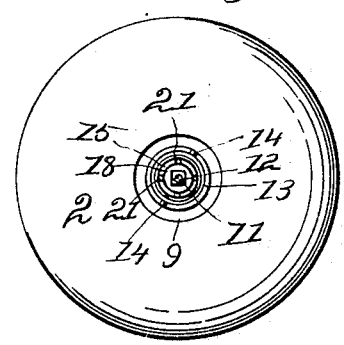
Witnesses.
Ina C. Graham
Nora Graham.
Fig. 5.
Inventor.
William S. Graham,
by L. P. Graham
his attorney.

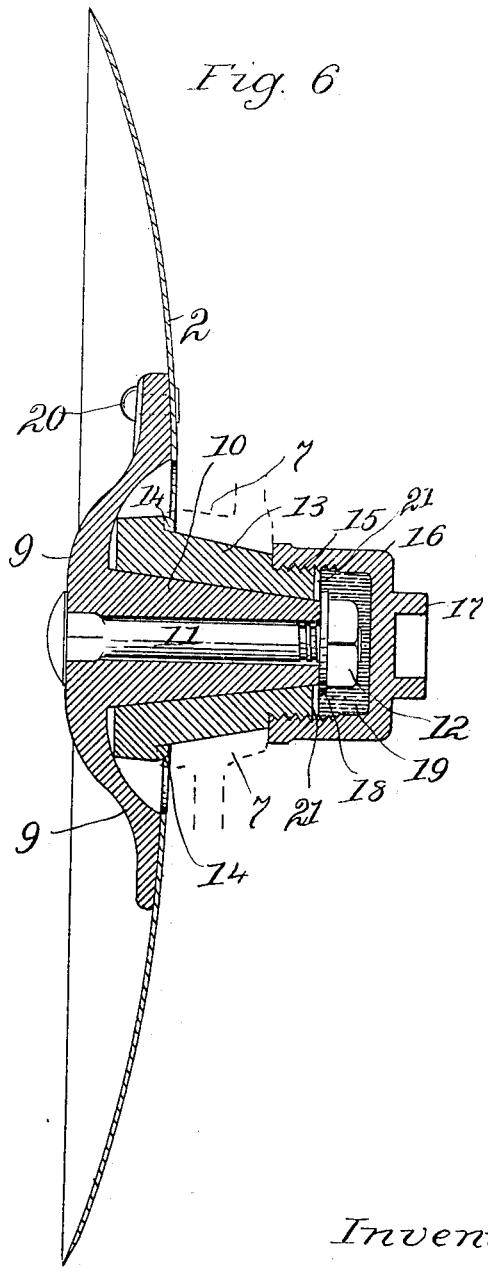

No. 782,194. Patented February 7, 1905.

UNITED STATES PATENT OFFICE.

WILLIAM S. GRAHAM, OF CANTON, ILLINOIS, ASSIGNOR TO PARLIN & ORENDORFF COMPANY, OF CANTON, ILLINOIS, A CORPORATION OF ILLINOIS.

PLANTER.

SPECIFICATION forming part of Letters Patent No. 782,194, dated February 7, 1905.

Application filed May 11, 1904. Serial No. 207,469.

*To all whom it may concern:*

Be it known that I, WILLIAM S. GRAHAM, of the city of Canton, county of Fulton, and State of Illinois, have invented certain new and useful Improvements in Planters, of which the following is a specification.

This invention relates to planters in which disks are used to open the furrows.

One object of the invention is to provide for dropping the seed from the final valve so that it will fall into the furrow in position to be readily covered by soil forced over it by the covering-wheels; and another object is to provide a practically dust-proof bearing for the disk and supply such bearing with a lubricant.

A disk throws the soil to one side of the furrow. Seed dropped behind the disk from a vertical second drop-valve tends to fall in the side of the furrow farthest from the removed soil, and heretofore it has been difficult to force the soil far enough sidewise by the covering-wheels to properly cover the seed dropped from the final valve. To overcome this deficiency, I turn the plate that coacts with the disk inward or toward the disk at its rear end and pivot the final drop-valve obliquely in the space between the plate and the disk. This provision causes the seed to be dropped from the final valve in the side of the furrow nearest the removed soil and lessens the distance the soil must be moved sidewise to properly cover the seed. The bearing for the disk includes the idea of carrying a supply of hard oil in a cap which closes the end of the bearing, and the construction of this feature of the invention will appear in the following specific description.

In the drawings forming part of this specification, Figure 1 is a side elevation of a planter shank and disk embodying my invention. Fig. 2 is a rear elevation of the shank and disk. Fig. 3 is an elevation of the inner surface of the shank. Fig. 4 is an elevation of the inner surface of the disk with the cap for the bearing removed. Fig. 5 is a detail of the cap for the disk-bearing. Fig. 6 is a section diametrically through the disk and the bearing.

The shank is shown at 1, and the disk at 2. At 3 is shown the final drop-valve. At 3ª is shown a rearward extension of the valve, through which the valve is operated, and at 4 is shown the runner-plate, which coacts with the disk and forms a part of the furrow-opener.

The valve 3 is pivoted at 5 in shank 1 and it is provided with a connecting-rod 6, which receives motion from the planter in a manner not necessary to explain herein, as it has nothing to do with the invention. The shank has a bore or opening, as 7, which provides for connecting the disk-bearing with the shank and which is extended beyond the side walls of the shank to form a sleeve. The sleeve is preferably circular and tapered, and it has notches, as 8, on the end nearest the disk. A circular plate 9 is shaped to fit the concave face of the disk, and the face of the plate opposed to the disk is concaved. A boss or spindle 10 extends from plate 9 through the center of the disk, and said spindle is bored centrally and tapered exteriorly. Rivets, as 20, provide for attaching spindle-plate 9 to the disk. A sleeve 13 is adapted to fit over spindle 10. Its inner part has a shoulder from which ribs or teeth 14 extend, and the outer part of the sleeve is screw-threaded exteriorly and provided in its end surface with radial grooves 21. A bolt 11 extends through the spindle from the concave side of the disk, a washer 18 fits over the threaded end of the bolt and bears against the small end of the spindle, and a nut 12 is screwed onto the bolt and against the washer 18. A cap 16 is interiorly threaded to screw onto sleeve 13, and it has a wrench seat or bearing 17, by which it is screwed to place. The cap is large enough internally to embrace the nut 12 and contain a considerable quantity of lubricating substance.

In assembling the parts the sleeve 13 is placed on spindle 10, the bolt 11 is inserted through the spindle, the washer 18 is put in place, and the nut 12 is screwed onto the bolt. The sleeve 7, formed around the opening through the shank, is then placed on sleeve 13, as shown in dotted lines in Fig. 6, the cap 16 is partly filled with a lubricant—axle-grease, for instance—and the assembling is completed by screwing the cap to place. The notches 8 of the shank-sleeve fit over ribs 14 of sleeve 13, and the cap holds the shank-sleeve in place.

The concave face of the disk is presented obliquely toward the soil, which leaves the inner end of sleeve 13 to the rear of the disk and extended into a concavity to which the dirt and dust has scanty access, and the cap 16 effectually excludes dust from the outer end of the bearing. The valve 3 is inclined from the vertical toward the disk in its downward extension, with the result that its lower end is in place to drop the seed close to the disk. (See Fig. 2.) The grooves 21 in the end of sleeve 13 facilitate the passage of the lubricant beneath the projecting edge of the washer to the bearing of the rotating spindle against the sleeve.

I claim—

1. In a planter, the combination of a shank, a furrow-opening disk journaled on the shank, a runner-plate attached to the shank opposite the disk and inclined toward the disk throughout its downward extension, and a valve-plate pivoted in the space between the runner-plate and the disk with its lower end inclined toward the disk.

2. In a planter, the combination of a shank, a furrow-opening disk journaled on the shank, a discharge extension of the shank inclined toward the disk, and an oblique valve pivoted in the discharge extension of the shank, substantially as described.

3. In a planter, the combination of a shank, a furrow-opening disk journaled on the shank, a runner-plate secured to the shank opposite the disk and inclined at its lower edge toward the disk, a discharge extension of the shank inclined toward the disk, and an oblique valve pivoted in the discharge extension of the shank, substantially as described.

4. In a furrow-opener, the combination of a shank having a transverse aperture, a disk, a plate attached to the disk, a spindle on the plate extending axially of the disk, a sleeve adapted to journal on the spindle and extend through the aperture of the shank, a bolt, nut and washer to hold the sleeve on the spindle, and a cap to screw over the end of the sleeve, substantially as described.

5. In a furrow-opener, the combination of a shank having a transverse aperture, a disk, a plate attached to the disk, a spindle on the plate extending axially of the disk, a sleeve adapted to journal on the spindle and extend through the aperture of the shank, means for holding the sleeve against rotation in the shank, a bolt, nut and washer to hold the sleeve on the spindle, and a lubricant-containing cap to screw over the end of the sleeve, substantially as described.

6. In a furrow-opener, the combination of a shank having a transverse aperture, a disk, a plate attached to the disk, a spindle on the plate extending axially of the disk, a sleeve adapted to journal on the spindle and extend through the aperture of the shank, said sleeve having radial grooves in its end, means for holding the sleeve against rotation in the shank, a bolt, nut and washer to hold the sleeve on the spindle and a lubricant-containing cap to screw over the end of the sleeve, substantially as described.

In testimony whereof I sign my name in the presence of two subscribing witnesses.

WM. S. GRAHAM.

Witnesses:
GEO. C. EGGLESTON,
M. N. KIRKHUFF.